United States Patent
Kitagawa

(12) 
(10) Patent No.: US 6,862,258 B2
(45) Date of Patent: Mar. 1, 2005

(54) RECORDABLE OPTICAL DRIVE AUTOMATICALLY CHANGING A WRITING SPEED IN ACCORDANCE WITH AN INTERFACE DATA TRANSFER SPEED

(75) Inventor: Masayuki Kitagawa, Irvine, CA (US)

(73) Assignee: Mitsumi Electric Co., Ltd., Tokyo (JP)

( * ) Notice: Subject to any disclaimer, the term of this patent is extended or adjusted under 35 U.S.C. 154(b) by 657 days.

(21) Appl. No.: 09/846,658

(22) Filed: May 1, 2001

(65) Prior Publication Data

US 2003/0026183 A1 Feb. 6, 2003

(51) Int. Cl.$^7$ ................................................. G11B 3/90
(52) U.S. Cl. ................ 369/53.3; 369/47.33; 369/47.38
(58) Field of Search ............................. 369/47.43, 44.25, 369/47.52, 47.28, 47.32, 47.33, 47.38, 53.3, 53.43, 53.34, 124.14

(56) References Cited

U.S. PATENT DOCUMENTS

| | | | |
|---|---|---|---|
| 5,268,893 A | * | 12/1993 | Call et al. ................. 369/47.52 |
| 5,396,476 A | * | 3/1995 | Asthana .................... 369/44.25 |
| 6,556,524 B1 | * | 4/2003 | Takeshita .................. 369/47.43 |
| 6,570,831 B1 | * | 5/2003 | Choi ........................ 369/47.28 |

* cited by examiner

*Primary Examiner*—Paul W. Huber
(74) *Attorney, Agent, or Firm*—Knobbe Martens Olson & Bear LLP

(57) ABSTRACT

An optical drive that detects a communication link interface speed to a host device and changes an optical media writing speed to reduce the likelihood that an error will occur during writing caused by an insufficient data interface rate in relation to the writing speed. In certain embodiments, the process for detecting and storing the preferred recording speed may be a software module which is part of the firmware of the optical drive. The invention provides a method of determining the preferred recording speed based on the interface speed and the maximum recording speed of the optical drive and storing this preferred recording speed for retrieval during recording of optical media.

27 Claims, 3 Drawing Sheets

RECORDABLE OPTICAL DRIVE AUTOMATICALLY CHANGING A WRITING SPEED IN ACCORDANCE WITH AN INTERFACE DATA TRANSFER SPEED

BACKGROUND OF THE INVENTION

1. Field of the Invention

The present invention relates to optical media recording devices such as CD-R, CD-RW, DVD-RAM, DVD–RW, and DVD+RW drives typically used with personal computers. More specifically, the invention relates to a system and method for automatically changing a writing speed of an optical medium in accordance with an interface data transfer speed.

2. Description of the Related Technology

A CD-RW (Compact Disc ReWriteable) drive is a typical peripheral storage device that is capable of recording and reading data to/from optical discs in a CD-R format and a CD-RW format. A CD-RW drive typically communicates with a host electronic device, for example a personal computer (PC), over a communication link, such as a specific type of peripheral device bus. Several common peripheral device buses are, for example, USB (Universal Serial Bus) and ATAPI (AT Attachment Packet Interface). A CD-RW drive is typically capable of recording and reading at standard constant linear velocity (CLV) rotational speeds, for example 1×, 2×, 4×, 8×, 12×, 16×, 20×, and 24× (and also referred to as single speed, double speed, quad speed, etc.). The linear velocity of the optical storage medium varies with its rotational velocity and the radius from the center of the storage medium at which an optical pick-up is accessing the medium.

During the recording process, the host device sends a stream of data across the communication link to the CD-RW drive. The CD-RW drive temporarily stores the data in a first-in-first-out (FIFO) buffer, and then writes the data to a continuous spiral track of the disc. The rate at which the data is read from the buffer and written to the optical disc is proportional to the linear velocity of the disc. Thus, higher linear velocities are preferred because the time it takes for a CD-RW drive to write to an optical disc is inversely proportional to the linear velocity of the optical disc.

In current implementations, a CD writing application on the PC requests the CD-RW maximum speed information so as to avoid a FIFO buffer under-run condition. The CD-RW drive returns the fixed information of the maximum speed it supports in writing to the storage medium, regardless of the data transfer speed of the communication link with the host device. This maximum speed information is typically stored in non-volatile memory (NVRAM) within the CD-RW drive, which is generally not modifiable by the host device. In other words, current implementations do not take into account the speed of the communication link when returning the maximum speed information, and thus require the PC user to manually modify the maximum speed via a user interface of the CD writing application.

Additionally, if the user incorrectly modifies the maximum speed, the rate at which data is transferred from the host to the CD-RW drive over the communication link may be of an insufficient speed to provide data at the rate required by the CD-RW drive based on the drive's fixed writing speed. As a result, it is possible for the drive's buffer to become empty, commonly referred to as a buffer under-run condition, resulting in an interruption to the data stream provided to the optical storage medium for writing.

The result of an interruption in the data stream being sent to the optical storage medium is an unrecoverable error. Where the optical storage medium is a CD-R disc, the disc becomes permanently unusable, wasting both time and the disc. Where the optical storage medium is a CD-RW disc, the disc can be re-written from scratch, but at the cost of frustration and additional time. Re-writing a CD-RW disc is particularly inconvenient when the CD-RW contained data from prior writes as the entire disc will have to be rewritten.

Table 1, below, provides a summary of selected speeds of an optical drive writing to a CD-R or CD-RW.

TABLE

| Speed | Data Transfer Rate | Time to Write 650 MB |
|---|---|---|
| 1X (single speed) | 150 KB/sec | 72 minutes |
| 2X | 300 KB/sec | 36 minutes |
| 4X | 600 KB/sec | 18 minutes |
| 8X | 1.2 MB/sec | 9 minutes |
| 12X | 1.8 MB/sec | 6 minutes |
| 16X | 2.4 MB/sec | 4.5 minutes |
| 20X | 3.0 MB/sec | 3.6 minutes |
| 24X | 3.6 MB/sec | 3 minutes |

To avoid a buffer under-run condition, a partial solution would be to dramatically increase the size of the buffer and fill the buffer with data before starting to record to the optical storage medium. A typical buffer may be about 2 to 4 MB in size. The practical considerations of size and cost make it difficult for a buffer to approach the size of the capacity of a full 650-MB Compact Disc. Therefore, even most large buffers would under-run eventually in situations where the data transfer speed of the communication link is slower than the optical drive recording speed, resulting in an unrecoverable error.

Another partial solution has been to allow the PC users to manually select a linear velocity that is slower than the maximum permissible by the optical drive and that matches the speed of the communication link. Although such manual selection of a slower writing speed allows the optical drive to record on a CD-R or CD-RW at a rate compatible with the interface speed and avoid buffer under-runs, automating the process is highly advantageous as the user may often neglect to modify the maximum speed or do so incorrectly.

SUMMARY OF CERTAIN INVENTIVE ASPECTS

To overcome the above-mentioned limitations, the invention provides a recordable optical drive detecting a communication link interface speed to a host device and determining a preferred recording speed based on the interface speed and a maximum drive recording speed. One aspect of the invention includes an optical drive system adapted to write data at a substantially linear density on an optical disc. The optical drive system is further adapted to set a linear velocity prior to writing to the optical drive to reduce a likelihood of a buffer under-run condition. The optical drive system further comprises a spindle adapted to rotate the optical disc and control a rotational speed of the optical disc, an optical pick-up adapted to write data to the optical disc, and a controller adapted to communicate with a host device, wherein the controller receives a communication link transfer speed between the host device and the controller, and wherein the controller determines a preferred recording speed.

The optical drive farther comprises the controller receiving data to be written to the disc. The optical drive further comprises the controller communicating with the optical pick-up to transmit the data to the disc. The optical drive further comprises the controller controlling the rotational speed of the spindle. The optical drive further comprises a non-volatile memory buffer to store the optical drive maximum recording speed. The optical drive further comprises a volatile memory buffer that, in communication with the controller, stores the preferred recording speed. The optical drive further comprises, in response to the preferred recording speed slower than the maximum recording speed, the controller setting the rotational speed of the spindle such that the linear velocity of the position on the optical disc adjacent to the optical pick-up is slower than the maximum recording speed. The optical drive further comprises the controller providing the preferred recording speed to the host device. The optical drive further comprises the host device setting a linear velocity for optical disc recording. The optical drive further comprises the optical disc corresponding to a recordable compact disc format, and the controller controlling the linear velocity such that a minimum linear velocity corresponds to a 1× speed. The optical drive further comprises the optical disc corresponding to a recordable compact disc format, and the controller controlling the linear velocity such that a minimum linear velocity corresponds to a 0.5× speed. The optical drive further comprises the controller maintaining the minimum linear velocity limit such that the angular velocity of the spindle does not fall below a preset limit. The optical drive further comprises the controller maintaining the minimum linear velocity limit such that the angular velocity of the spindle does not fall below a preset limit.

An additional aspect of the invention includes a method of writing data to an optical disc, comprising receiving data to be written to the optical disc from a host device, storing data to be written to the optical disc in a memory buffer, writing data from the memory buffer to the optical disc in a continuous write sequence at a substantially constant linear density, detecting a communication link transfer speed slower than the optical drive maximum recording speed, and changing a linear velocity of the optical disc in response to the communication link transfer speed prior to writing to the optical disc so as to reduce the likelihood of a buffer under-run.

The method further comprises retrieving the optical drive maximum recording speed from a location in non-volatile memory in the optical drive. The method further comprises determining the preferred recording speed as the slower of (1) the communication link transfer speed between the host device and the controller, and (2) the optical drive maximum recording speed. The method further comprises storing the preferred recording speed in a volatile memory in the optical drive. The method further comprises the host device retrieving the preferred recording speed from the controller. The method further comprises the host device commanding the controller to select a linear velocity.

An additional aspect of the invention includes an optical drive system adapted to write data on an optical disc and set a linear velocity prior to writing to the optical drive. The optical drive system comprises a control circuit adapted to receive data to be written to the optical disc from a host device, a buffer adapted to store data received by the control circuit, a writing circuit adapted to retrieve data from the buffer, wherein the writing circuit writes the data from the buffer as a series of pulses recorded on the optical disc in a continuous write sequence at a substantially constant linear density, a preferred recording speed module adapted to detect a condition of a communication link transfer speed slower than the optical drive maximum recording speed, and a writing speed circuit adapted to control a rate at which the writing circuit records to the optical disc, wherein the writing circuit sets a linear velocity of the optical disc in response to the detected condition prior to writing to the optical disc so as to reduce the likelihood of a buffer under-run.

The optical drive system further comprises the preferred recording speed detection module as a software program which retrieves: (1) a parameter related to a communication link transfer speed between the host device and the optical drive, and (2) a parameter related to an optical drive maximum recording speed. The optical drive system further comprises the software program determining a preferred recording speed. The optical drive system further comprises the software program storing the preferred recording speed, and transmitting the stored preferred recording speed to the host device.

An additional aspect of the invention includes an optical drive system adapted to select a preferred optical drive recording speed. The optical drive system comprises a means for detecting a communication link speed, a means for comparing the communication link speed to an optical drive maximum recording speed, and a means for writing the communication link speed in memory if the communication link speed is less than the optical drive recording speed, otherwise writing the optical drive recording speed in memory. The optical drive system further comprises a means for returning the preferred optical drive recording speed in memory to a host device.

An additional aspect of the invention includes a method of selecting a preferred optical drive recording speed comprising detecting a communication link speed, comparing the communication link speed to an optical drive maximum recording speed, writing the communication link speed in memory if the communication link speed is less than the optical drive recording speed, otherwise writing the optical drive recording speed in memory. The method further comprises transmitting the preferred optical drive recording speed to a host device.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate certain embodiments of the invention, and not to limit the scope of the invention.

DETAILED DESCRIPTION OF CERTAIN INVENTIVE EMBODIMENTS

Although this invention is described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the claims.

The present invention addresses the above problem by providing a recordable optical drive, for example a CD-RW drive, that automatically adjusts the storage media rotational speed, and thereby the write speed, in response to the data transfer speed of the particular communication link that is being utilized. The adjustments to the rotational speed are preferably made based on (a) the maximum interface transfer speed, (b) the maximum rotational speed (and thus recording speed) of the optical drive, or (c) both. In a preferred embodiment, both speeds will be used in adjusting the rotational speed. In one embodiment, referred to as the "step method," the rotation speed can be set only to the drive's discrete standard speeds, for example 1×, 2×, 4×, 8×, 12×, 16×, 20× and 24× speeds.

In another embodiment, referred to as the "continuous method," the rotational speed may be adjusted over a continuous range once the maximum transfer speed of the communication link is detected. The continuous method may be used where the maximum speed of the communication link lies between two of the drive's standard speeds, for example between 4× and 8×. The continuous method allows the drive's rotational speed to be more closely matched to the maximum transfer speed of the communication link, resulting in a decrease in the total recording time of an optical storage medium.

Figure 1:
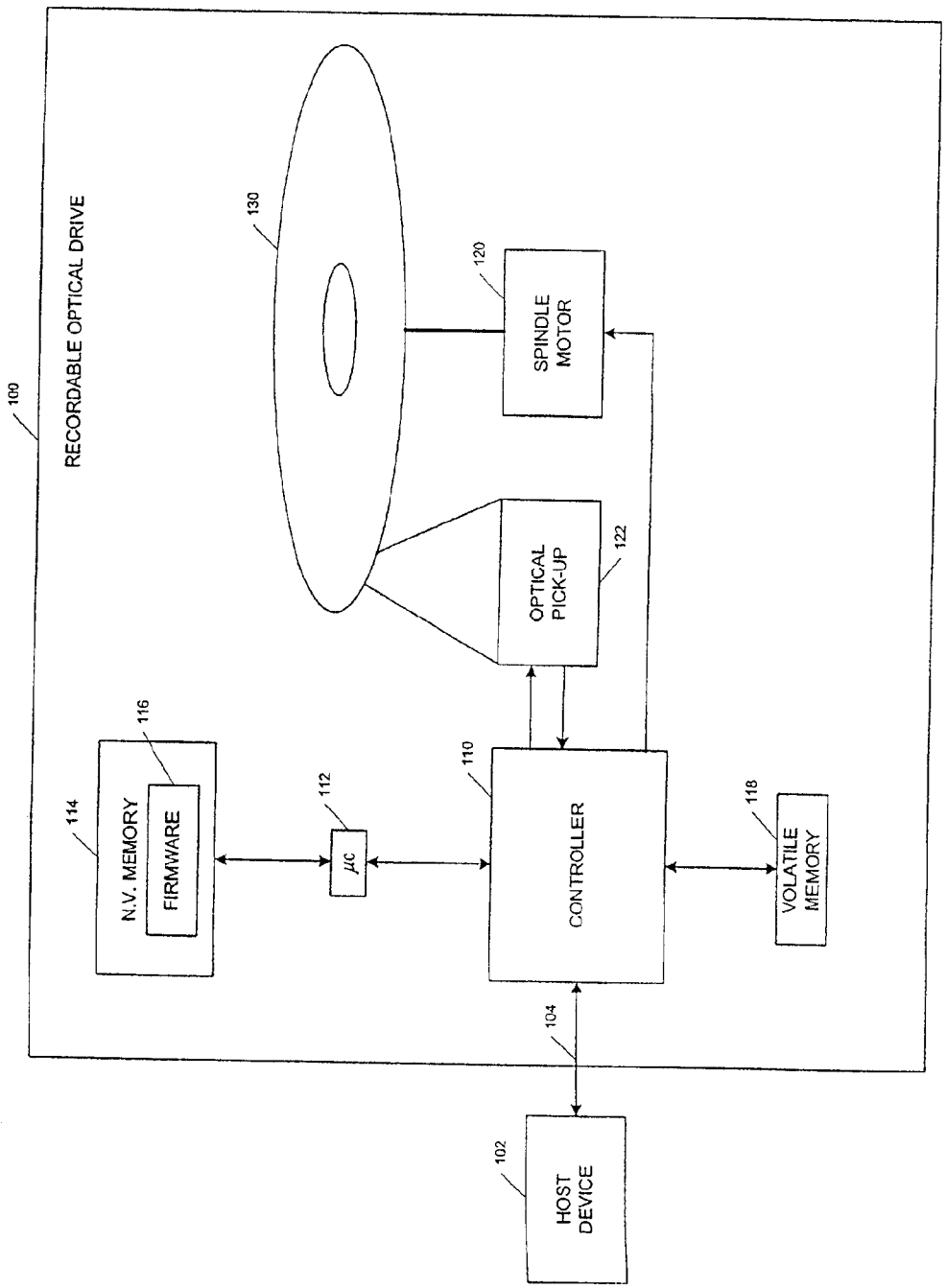
FIG. 1 is a block diagram illustrating a top-level view of an optical drive system connected to a host device.

FIG. 1 illustrates the basic components of a CD-RW recordable optical drive 100 by which the present invention may be implemented. The drive 100 is shown together with a host device 102, which may be an electronic device such as a personal computer (PC), a Personal Digital Assistant (PDA), a digital camera or a camcorder, for example. The drive 100 is shown connected to the host 102 through a communication link 104. The communication link 104 may be one of a plurality of transmission media that allows signals representing data and command information to be electronically transferred between the drive 100 and the host 102. In one embodiment, the communication link 104 is a USB cable and associated device bus hardware components. In another embodiment, the communication link 104 is a wireless infrared connection and associated device bus hardware components. In yet other embodiments, the communication link 104 may be other types of cables and associated device bus hardware components including, but not limited to, ATAPI, SCSI, and a parallel port.

The optical drive 100 is comprised of a controller 110, a microcontroller 112, a nonvolatile memory 114 which stores firmware 116 executed by the microcontroller 112, and a volatile memory 118. In addition, the drive 100 includes a spindle motor 120 and an optical pick-up 122. The spindle motor 120 controls the rotation speed of an optical storage medium 130, for example an optical disc. As the drive 100 rotates the storage medium 130, the optical pick-up 122 of the drive 100 reads and writes data to/from the storage medium 130.

During a recording operation, the host device 102 sends the data to be recorded to the optical medium 130 over the communication link 104 to the optical drive 100. The controller 110 temporarily stores this data in a buffer in the volatile memory 118. During this process, the controller 110 continuously reads the data from the buffer on a first-in-first-out (FIFO) basis and provides such data to the optical pick-up 122 for writing to the storage medium 130. The rate at which data is read from the data buffer in volatile memory 118 and written to the storage medium 130 is directly proportional to the linear velocity of the rotating optical storage medium 130. An example of a typical linear velocity is 4× during normal operation. At the constant linear velocity of 4×, the recording process typically takes about 18 minutes for a full 650 MB recordable Compact Disc. At a constant linear velocity of 4×, the rate at which data is written to the storage medium 130 is 600 kB per second. At 4×, data transfer rates over the communication link 104 slower than 600 kB per second result in an eventual depletion of the data buffer.

Figure 2:
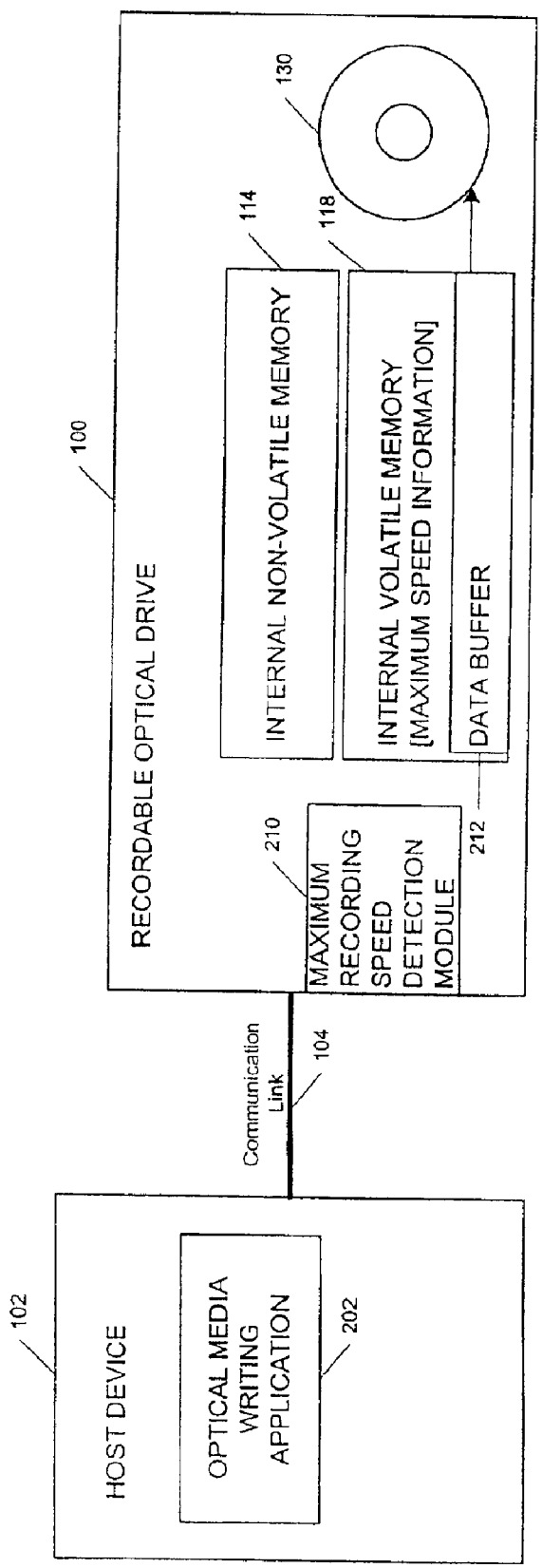
FIG. 2 is a block diagram illustrating an embodiment of a configuration for connecting a host device with a recordable optical drive, detecting a communication link speed and storing the preferred recording speed according to the invention.

FIG. 2 is a diagram illustrating one embodiment of the system configuration for connecting the host device 102 with the recordable optical drive 100, in which the preferred recording speed is stored in the drive's volatile memory 118 and the data to be recorded on the optical disc 130 is temporarily stored in a FIFO buffer 212. The preferred recording speed is determined by detecting the maximum data transfer speed of the communication link 104, comparing it with the maximum writing speed of the drive 100, and using the slower of these two speeds. In one embodiment, the process for detecting the maximum recording speed 210 is a firmware module that is executed in the microcontroller 112. One example of such a module to detect the maximum recording speed is included as Appendix A. In another embodiment, this process may be an electronic circuit. In one embodiment, this process is performed only during the power up processing of the host device 102 and the optical drive 100. In another embodiment, this process may be performed at the request of a user of the host device 102. The determination may occur at other times, as well.

The optical drive writing application 202 executing on the host device 102 typically requests the recording speed from the optical drive 100 prior to beginning a recording operation. The optical drive writing application 202 may adjust the writing speed of the drive 100 based on the preferred recording speed value returned from the optical drive 100, which takes into account the maximum transfer speed of the communication link 104.

Figure 3:
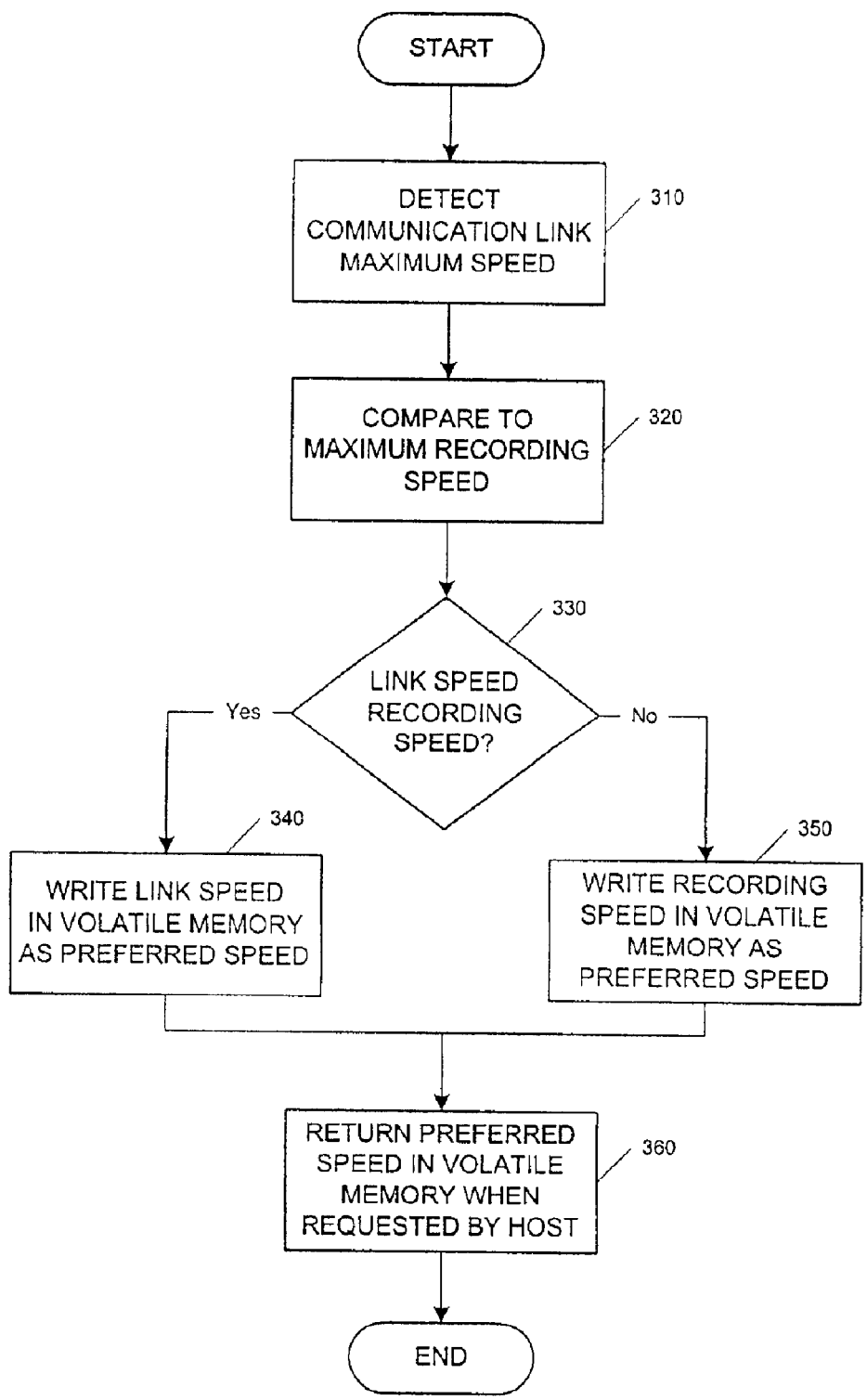
FIG. 3 is a flowchart illustrating an embodiment of the actions of the recordable optical driver in determining the preferred recording speed value to return to the host device according to the invention.

FIG. 3 is a flowchart illustrating one embodiment of the process for determining the appropriate preferred speed value to store in the optical drive's 100 volatile memory 118 for return to the host device 102 by the drive 100 upon request. At stage 310, the process detects and temporarily stores the maximum transfer speed of the communication link 104 in volatile memory 118. Stage 310 may be implemented in the communication link speed determination module 210 shown in FIG. 2. In one embodiment, the detect communication link speed process 310 accesses the maximum communication link transfer speed by reading the contents of a host register connected to the communication link 104. In a further embodiment, in a system utilizing a USB bus, the drive 100 determines the maximum communication link transfer speed by activating a Chirp K on the bus. In response to this Chirp K, the host device 102 issues Chirp K and Chirp J only if the high speed mode is supported. By detecting this Chirp K and Chirp J issued by the host device 102, the drive 100 is thereby able to determine that high speed USB mode is presently in use. Conversely, if the drive 100 does not detect the Chirp K and Chirp J signals on the bus, it determines that high speed USB mode is not presently in use. One of ordinary skill in the relevant technology will understand this embodiment utilizing a USB bus.

At stage 320, the process compares the speed detected and temporarily stored at stage 310 to the maximum recording speed of the optical drive 100 which is retrieved from non-volatile memory 114 by the microcontroller 112. At stage 330, the process determines which of the two values compared at stage 320 represents the slower of the two speeds. In the case where the communication link transfer speed is slower than the maximum recording speed of the optical drive 100, at stage 340, the process writes the communication link speed to a location in the volatile memory 118 for storage of the preferred recording speed. In the alternate case where the optical drive recording speed is equal to or slower than the speed of the communication link 104, at stage 350, the process writes the optical drive recording speed to the location in the volatile memory 118 for storage of the preferred recording speed. At stage 360, the process returns the preferred recording speed value stored in the location in the volatile memory at either stages 340 or 350 when requested by the host device 102. In one embodiment, stages 310–360 of FIG. 3 are firmware modules that are executed on the controller 110. In another embodiment, certain of these stages may alternatively be firmware modules that are executed on the microcontroller 112. In a further embodiment, an electronic circuit may perform these stages. In an embodiment employing a USB bus, the host device 102 may send a "Get Performance" command to the drive 100, in response to which the drive 100 returns to the host device 102 a response that indicates the drive's recording speed. One of ordinary skill in the relevant technology will understand this embodiment utilizing a USB bus.

The invention ensures a sufficient stream of recording data, thereby preventing corruption of optical storage media due to interruptions caused by the data buffer becoming empty. As a result of varying the recording speed of the drive so that it is no faster than the speed of the communication link, data to be recorded will be transferred by the CD writing application on the host at a sufficient speed such that the data buffer in the drive will consistently contain ample data for writing to the optical storage medium. Therefore, since the data buffer is not likely to become empty of data for recording, buffer under-run conditions are avoided, which in turn ensures that the associated recording error does not occur. This saves time, effort and frustration in only having to record the optical storage medium a single time, instead of having to record the storage medium multiple times, or having to discard it permanently in the case of CD-R and similar recording media.

It will be understood by one of ordinary skill in the art that if the data buffer becomes full with data to record, the controller may limit the data transfer speed from the host device to a preset limit, or temporarily suspend data transfer, to prevent the buffer from over-running. This is a normally occurring event during the recording process, and does not constitute an error condition or require any additional handling beyond what exists in the current technology.

Although described above in connection with particular embodiments of the present invention, it should be understood the descriptions of the embodiments are illustrative of the invention and are not intended to be limiting. Various modifications and applications may occur to those skilled in the art without departing from the true scope of the invention as defined in the appended claims.

APPENDIX A

```
/**
 * Function to check the current USB Mode.
 *   The USB LSI of this drive automatically becomes USB 2.0 Mode
 *   (Mode 2) if the Host supports USB 2.0; becomes USB 1.0 or
 *   1.1 Mode (Mode 1) if the Host supports only USB 1.0 or 1.1.
 *   Note that USB 1.0 and 1.1 is the same in data transfer speed.
 **/
#define USB_LSI_C_USB_MODE   0x8004   /* Register Address of USB
                                         LSI for current USB mode */
unsigned int check_usb_mode( )
{
    /* Today, only USB 1.0, 1.1 (Mode 1) & USB 2.0 (Mode 2) exist */
    if (USB_LSI_C_USB_MODE & 0x01 == 0)
        return (1);  /* Currently working as USB 1.0 or 1.1 */
    else
        return (2);  /* Currently working as USB 1.0 or 1.1 */
}
/**
 * Function to determine the maximum speed in which the drive can
 * possibly write to CD-R/WR media, considering USB speed.
 *
 * Note that the caller of this function should determine the absolute
 * maximum speed to check the media's supported writing speed.
 **/
#define UNKNOWN_SPEED         0      /* unknown speed, i.e. error */
#define MAX_WRITE_SPEED_USB_1 4      /* max write speed USB 1.0,1.1 */
#define MAX_WRITE_SPEED_USB_2 175    /* max write speed for USB 2.0 */
#define MAX_WRITE_SPEED_DRIVE 16     /* this drive's max write speed */
unsigned int determine_write_speed( )
{
    unsigned int    max_write_usb;
/* Switch statement designed considering possible future extension */
    switch (check_usb_mode( )){
        case 1:    /* USB 1.0 or 1.1 */
            max_write_usb = MAX_WRITE_SPEED_USB_1;
            break;
        case 2: /* USB 2.0 */
            max_write_usb = MAX_WRITE_SPEED_USB_2;
```

APPENDIX A-continued

```
        break;
    default:      /* unknown USB mode, error */
        return (UNKNOWN_SPEED);
    }
    if (MAX_WRITE_SPEED_DRIVE < max_write_usb)
        return (MAX_WRITE_SPEED_DRIVE);      /* This drive's max is
                                   less than USB max */
    else
        return (max_write_usb);
```

What is claimed is:

1. An optical drive system, the optical drive system adapted to write data at a substantially linear density on an optical disc, the optical drive system further adapted to set a linear velocity prior to writing to the optical drive to reduce a likelihood of a buffer under-run condition, the optical drive system comprising:
- a spindle adapted to rotate the optical disc and control a rotational speed of the optical disc;
- an optical pick-up adapted to write data to the optical disc; and
- a controller adapted to communicate with a host device, wherein the controller receives a communication link transfer speed between the host device and the controller, and wherein the controller determines a preferred recording speed based on the communication link transfer speed.

2. The optical drive as defined in claim 1, wherein the controller receives data to be written to the disc.

3. The optical drive as defined in claim 1, wherein the controller communicates with the optical pick-up to transmit the data to the disc.

4. The optical drive as defined in claim 1, wherein the controller controls the rotational speed of the spindle.

5. The optical drive as defined in claim 1, further comprising a non-volatile memory buffer to store the optical drive maximum recording speed.

6. The optical drive as defined in claim 1, further comprising a volatile memory buffer, in communication with the controller, to store the preferred recording speed.

7. The optical drive as defined in claim 1, wherein in response to the preferred recording speed slower than the maximum recording speed, the controller sets the rotational speed of the spindle such that the linear velocity of the position on the optical disc adjacent to the optical pick-up is slower than the maximum recording speed.

8. The optical drive as defined in claim 1, wherein the controller provides the preferred recording speed to the host device.

9. The optical drive as defined in claim 8, wherein the host device sets a linear velocity for optical disc recording.

10. The optical drive as defined in claim 1, wherein the optical disc corresponds to a recordable compact disc format, and wherein the controller controls the linear velocity such that a minimum linear velocity corresponds to a 1× speed.

11. The optical drive as defined in claim 1, wherein the optical disc corresponds to a recordable compact disc format, and wherein the controller controls the linear velocity such that a minimum linear velocity corresponds to a 0.5× speed.

12. The optical drive as defined in claim 10, wherein the controller maintains the minimum linear velocity limit such that the angular velocity of the spindle does not fall below a preset limit.

13. The optical drive as defined in claim 11, wherein the controller maintains the minimum linear velocity limit such that the angular velocity of the spindle does not fall below a preset limit.

14. A method of writing data to an optical disc, comprising:
- receiving data to be written to the optical disc from a host device;
- storing data to be written to the optical disc in a memory buffer;
- writing data from the memory buffer to the optical disc in a continuous write sequence at a substantially constant linear density;
- detecting a communication link transfer speed slower than the optical drive maximum recording speed; and
- changing a linear velocity of the optical disc in response to the communication link transfer speed prior to writing to the optical disc so as to reduce the likelihood of a buffer under-run.

15. The method as defined in claim 14, further comprising retrieving the optical drive maximum recording speed from a location in non-volatile memory in the optical drive.

16. The method as defined in claim 15, further comprising determining the preferred recording speed as the slower of (1) the communication link transfer speed between the host device and the controller, and (2) the optical drive maximum recording speed.

17. The method as defined in claim 16, further comprising storing the preferred recording speed in a volatile memory in the optical drive.

18. The method as defined in claim 17, further comprising the host device retrieving the preferred recording speed from the controller.

19. The method as defined in claim 18, further comprising the host device commanding the controller to select a linear velocity.

20. An optical drive system, the optical drive system adapted to write data on an optical disc and set a linear velocity prior to writing to the optical drive, the optical drive system comprising:
- a control circuit adapted to receive data to be written to the optical disc from a host device;
- a buffer adapted to store data received by the control circuit;
- a writing circuit adapted to retrieve data from the buffer, wherein the writing circuit writes the data from the buffer as a series of pulses recorded on the optical disc in a continuous write sequence at a substantially constant linear density;
- a preferred recording speed module adapted to detect a condition of a communication link transfer speed slower than the optical drive maximum recording speed; and a writing speed circuit adapted to control a rate at which the writing circuit records to the optical disc, wherein the writing circuit sets a linear velocity of the optical disc in response to the detected condition prior to writing to the optical disc so as to reduce the likelihood of a buffer under-run.

21. The optical drive system as defined in claim 20, wherein the preferred recording speed detection module is a software program which retrieves: (1) a parameter related to a communication link transfer speed between the host device and the optical drive, and (2) a parameter related to an optical drive maximum recording speed.

22. The optical drive system as defined in claim 21, wherein the software program further determines a preferred recording speed.

23. The optical drive system as defined in claim 22, wherein the software program further stores the preferred recording speed, and wherein the software program transmits the stored preferred recording speed to the host device.

24. An optical drive system adapted to select a preferred optical drive recording speed, the optical drive system comprising:

means for detecting a communication link speed;

means for comparing the communication link speed to an optical drive maximum recording speed; and means for writing the communication link speed in memory if the communication link speed is less than the optical drive recording speed, otherwise writing the optical drive recording speed in memory.

25. The optical drive system as defined in claim 24, further comprising a means for returning the preferred optical drive recording speed in memory to a host device.

26. A method of selecting a preferred optical drive recording speed comprising:

detecting a communication link speed;

comparing the communication link speed to an optical drive maximum recording speed; and writing the communication link speed in memory if the communication link speed is less than the optical drive recording speed, otherwise writing the optical drive recording speed in memory.

27. The method as defined in claim 26, further comprising transmitting the preferred optical drive recording speed to a host device.

* * * * *